United States Patent
Liao et al.

(10) Patent No.: US 11,514,309 B2
(45) Date of Patent: Nov. 29, 2022

(54) METHOD AND APPARATUS FOR ACCELERATING DISTRIBUTED TRAINING OF A DEEP NEURAL NETWORK

(71) Applicant: Beijing University of Posts and Telecommunications, Beijing (CN)

(72) Inventors: Jianxin Liao, Beijing (CN); Jingyu Wang, Beijing (CN); Jing Wang, Beijing (CN); Qi Qi, Beijing (CN); Jie Xu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 1024 days.

(21) Appl. No.: 16/215,033

(22) Filed: Dec. 10, 2018

(65) Prior Publication Data
US 2019/0392307 A1    Dec. 26, 2019

(30) Foreign Application Priority Data
Jun. 21, 2018    (CN) .......................... 201810646003.0

(51) Int. Cl.
*G06N 3/08*    (2006.01)
*G06N 3/04*    (2006.01)

(52) U.S. Cl.
CPC .................. *G06N 3/08* (2013.01); *G06N 3/04* (2013.01)

(58) Field of Classification Search
CPC .......... G06N 3/08; G06N 3/04; G06N 3/0454; G06N 3/084; G06N 3/10; G06F 9/4881; G06T 1/20
See application file for complete search history.

(56) References Cited

U.S. PATENT DOCUMENTS 9,460,711 B1 *    10/2016    Vanhoucke ............. G10L 15/16

OTHER PUBLICATIONS

Zhang, H., Zheng, Z., Xu, S., Dai, W., Ho, Q., Liang, X., . . . & Xing, E. P. (2017). Poseidon: An efficient communication architecture for distributed deep learning on {GPU} clusters. In 2017 USENIX Annual Technical Conference (USENIX ATC 17) (pp. 181-193). (Year: 2017).*

(Continued)

*Primary Examiner* — Brian M Smith
*Assistant Examiner* — Henry Trong Nguyen
(74) *Attorney, Agent, or Firm* — Renner, Otto, Boisselle & Sklar, LLP

(57) ABSTRACT

Embodiments of the present invention provide a method and apparatus for accelerating distributed training of a deep neural network. The method comprises: based on parallel training, the training of deep neural network is designed as a distributed training mode. A deep neural network to be trained is divided into multiple sub-networks. A set of training samples is divided into multiple subsets of samples. The training of the deep neural network to be trained is performed with the multiple subsets of samples based on a distributed cluster architecture and a preset scheduling method. The multiple sub-networks are simultaneously trained so as to fulfill the distributed training of the deep neural network. The utilization of the distributed cluster architecture and the preset scheduling method may reduce, through data localization, the effect of network delay on the sub-networks under distributed training; adapt the training strategy in real time; and synchronize the sub-networks trained in parallel. As such, the time required for the distributed training of the deep neural network may be reduced and the training efficiency of the deep neural network may be improved.

12 Claims, 3 Drawing Sheets

(56) References Cited

OTHER PUBLICATIONS

Yang, B., Wang, Y. D., & Su, X. H. (Aug. 2005). Research and design of distributed training algorithm for neural networks. In 2005 International Conference on Machine Learning and Cybernetics (vol. 7, pp. 4044-4049). IEEE. (Year: 2005).*

* cited by examiner

METHOD AND APPARATUS FOR ACCELERATING DISTRIBUTED TRAINING OF A DEEP NEURAL NETWORK

CROSS REFERENCE TO RELATED APPLICATION

The present application claims the priority to a Chinese Patent Application No. 201810646003.0 filed with the Chinese Patent Office on Jun. 21, 2018 and entitled "METHOD AND APPARATUS FOR ACCELERATING DISTRIBUTED TRAINING OF A DEEP NEURAL NETWORK", which is incorporated herein by reference in its entirety.

TECHNICAL FIELD

The present invention relates to the field of deep neural network training technology, and in particular, to a method and apparatus for accelerating the distributed training of a deep neural network.

BACKGROUND

Deep neural networks have been successfully applied in many fields comprising image recognition, texture classification, speech recognition, and so on. In recent years, performance of deep neural networks has been significantly improved as a result of the use of deeper network architectures and larger training sample sets for training. However, as a result of the explosive growths of network parameters and training samples, the training of a deep neural network becomes very time-consuming. This is a serious problem in the process of training.

In order to solve this problem, researchers have proposed a parallel training of the deep neural network, which mainly involves the use of multiple graphics processor cores to train the network in parallel. Training time may thus be reduced. Currently, there are two main types of the parallel training: sample parallel training and model parallel training. In sample parallel training, a training sample set is divided into multiple subsets, which are to be used to train the same deep neural network in parallel. In model parallel training, a deep neural network is divided into multiple hierarchical networks which are to be trained on different graphics processor.

Both ways reduce the training time of a deep neural network by decreasing the training load of a single graphics processor and utilizing multiple graphics processors for parallel training. However, the multiple processors may not be located in one single physical device. For a distributed cluster composed of multiple processors, how to reduce the impact of network delay on the time for distributed training of the deep neural network has now become a pressing issue in the field of deep neural network technology.

SUMMARY

Embodiments of the present invention are directed to provide a method and apparatus for accelerating distributed training of a deep neural network, so as to reduce the training time and improve the training efficiency of the deep neural network. Specifically, the following technical embodiments are provided.

In a first aspect, embodiments of the present invention provide a method for accelerating distributed training of a deep neural network. The method comprises:

dividing a deep neural network to be trained into multiple subnetworks;

dividing a pre-acquired set of training samples into multiple subsets of samples; and performing the distributed training of the deep neural network to be trained with the multiple subsets of samples based on a distributed cluster architecture and a preset scheduling method; wherein, the training of each subnetwork is accelerated by reducing the effect of network delay through data localization; wherein, the multiple subnetworks are simultaneously trained, and training progresses of parallel subnetworks are synchronized to accelerate the distributed training of the deep neural network; wherein, the data localization means that a task is performed at a preset cloud resource node to minimize data transmission time.

Optionally, the distributed cluster architecture comprises multiple cloud resource nodes having multiple applications executed thereon, each of the applications comprising multiple tasks; wherein, each of the tasks is configured for training a subnetwork based on an input data set, and the data set comprises a subset of samples or a training result obtained from a previous training stage of the subnetwork;

performing distributed training of the deep neural network to be trained with the multiple subsets of samples based on a distributed cluster architecture and a preset scheduling method comprises:

scheduling the multiple tasks to the multiple cloud resource nodes according to equation $$c = \min\left(\sum_{p=1}^{A} a^p\right),$$

accelerating the training of each subnetwork, and synchronizing training progresses of the multiple subnetworks, so as to accelerate the distributed training of the entire deep neural network to be trained;

wherein, c denotes the remaining time required to fulfill the current distributed training of the deep neural network, p denotes a numeral of an application, A denotes the number of the applications, and $a^p$ a denotes a sum of remaining run-time and data transmission time of the application of numeral p.

Optionally, the calculation of the sum of remaining run-time and the data transmission time of the application of numeral p comprises: calculating the sum of remaining run-time and data transmission time of the application of numeral p according to the following equations:

$$a^p = f^p + \min_{n \in N^C}\sum_{t=1}^{p^t} m^t; f^p = \begin{cases} u^p \times \dfrac{1 - pr^p}{pr^p}, 0 < pr^p \leq 1 \\ u^p, pr^p = 0 \end{cases};$$

$$m^t = \min_{n \in N^C}(m_n^t + w^n); m_n^t = \dfrac{id_d^t}{band_n^d};$$

wherein, $N^C$ denotes a set of cloud resource nodes, $f^p$ denotes the remaining run-time of the application of numeral p, t denotes a numeral of a task, $p^t$ denotes the number of tasks comprised in the application of numeral p, $u^p$ denotes the elapsed run-time of the application of numeral p, $pr^p$ denotes the running progress of the application of numeral p, $m^t$ denotes the estimated minimum data transmission time of a task of numeral t, $w^n$ denotes the waiting time till the resource of a cloud resource node of numeral n becomes idle, $m_n^t$ denotes the data transmission time of the task of numeral t running on the cloud resource node of numeral n, $id_d^t$ denotes an amount of data stored by, the task of numeral t, on a cloud resource node of numeral d, and $band_n^d$ denotes a link bandwidth between the cloud resource node of numeral n and the cloud resource node of numeral d.

Optionally, scheduling the multiple tasks to the multiple cloud resource nodes according to equation $$c = \min\left(\sum_{p=1}^{A} a^p\right)$$

comprises:

mapping the scheduling of the multiple tasks into a directed graph model;

transforming the directed graph model into a residual graph; and scheduling the multiple tasks to the multiple cloud resource nodes based on the preset scheduling method and the residual graph.

Optionally, mapping the scheduling of the multiple tasks into a directed graph model as follows:

the directed graph model comprises a source node, application nodes, task nodes, computing nodes and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node;

wherein, each of the node objects has a potential, the node objects comprising the source node, the application nodes, the task nodes, the computing nodes and the destination node; wherein, a positive potential indicates that the node object has assignable tasks, the number of the assignable tasks being equal to the positive potential; a negative potential indicates that the number of tasks that have been assigned to the node object exceeds the number of maximum assignable tasks of the node object, and the number of excessive tasks is the absolute value of the negative potential; each directed edge has two attribute values: cost and capacity; the cost of a directed edge from a source node to an application node denotes a normalized remaining runtime; the cost of a directed edge from an application node to a task node is 0; the cost of a directed edge from a task node to a computing node denotes the data transmission time required by a task corresponding to the task node, the task being performed on a cloud resource node corresponding to the computing node; the cost of a directed edge from a computing node to a destination node denotes the waiting time till the resource of a cloud resource node corresponding to the computing node becomes idle; and the capacity of a directed edge denotes a total number of schedulable tasks of the originating node of this directed edge.

Optionally, scheduling the multiple tasks to the multiple cloud resource nodes based on the preset scheduling method and the residual graph comprises:

S401, determining whether there are currently unscheduled tasks; and if there are currently unscheduled tasks, proceeding to S402, or if there are no unscheduled tasks, terminating the flow;

S402, traversing the node objects in the residual graph, and for each node object, determining whether the potential of the node object is positive; if the potential of the node object is positive, proceeding to S403; or if the potential of the node object is negative, proceeding to S406;

S403, adding the node object into a predefined set, calculating a total number of currently unscheduled tasks in the predefined set as a first number, and calculating a number of tasks that can be assigned at a minimum cost as a second number;

S404, determining whether the first number is greater than the second number; and if the first number is greater than the second number, proceeding to S405, or if the first number is less than the second number, proceeding back to S402;

S405, assigning, along directed edges that produce the minimum cost, the second number of unscheduled tasks to corresponding node objects, and proceeding to S407;

S406, determining the node object with a negative potential as a destination node object; determining the first node object in the predefined set as a source node object; determining a path, between the source node object and the destination node object, that has a minimum cost; and assigning a preset number of unscheduled tasks to the node object with a negative potential; wherein the preset number is a minimum capacity in the capacities of the directed edges comprised in the path;

S407, updating the parameters of the residual graph and proceeding back to S401.

In the second aspect, embodiments of the present invention provide an apparatus for accelerating distributed training of a deep neural network, and the apparatus comprises:

a first dividing module, configured for dividing a deep neural network to be trained into multiple subnetworks;

a second dividing module, configured for dividing a pre-acquired set of training samples into multiple subsets of samples;

a network training module, configured for performing the distributed training of the deep neural network to be trained with the multiple subsets of samples based on a distributed cluster architecture and a preset scheduling method; wherein, the training of each subnetwork is accelerated by reducing the effect of network delay through data localization; wherein, the multiple subnetworks are simultaneously trained, and training progresses of parallel subnetworks are synchronized to accelerate the distributed training of the deep neural network; wherein, the data localization means that a task is performed at a preset cloud resource node to minimize data transmission time.

Optionally, the distributed cluster architecture comprises multiple cloud resource nodes having multiple applications executed thereon, each of the applications comprising multiple tasks; wherein, each of the tasks is configured for training a subnetwork based on an input data set, and the data set comprises a subset of samples or a training result obtained from a previous training stage of the subnetwork;

the network training module comprises:

a network training sub-module, configured for scheduling the multiple tasks to the multiple cloud resource nodes according to equation $$c = \min\left(\sum_{p=1}^{A} a^p\right),$$

accelerating the training of each subnetwork, and synchronizing training progresses of the multiple subnetworks, so as to accelerate the distributed training of the entire deep neural network to be trained;

wherein, c denotes the remaining time required to fulfill the current distributed training of the deep neural network, p denotes a numeral of an application, A denotes the number of the applications, and $a^p$ denotes a sum of remaining run-time and data transmission time of the application of numeral p obtained by a time computing module.

Optionally, the time computing module comprises:

a time computing sub-module, configured for calculating the sum of remaining run-time and data transmission time of the application of numeral p according to the following equations:

$$a^p = f^p + \min_{n \in N^C} \sum_{t=1}^{p^t} m^t; f^p = \begin{cases} u^p \times \frac{1-pr^p}{pr^p}, 0 < pr^p \leq 1 \\ u^p, pr^p = 0 \end{cases};$$

$$m^t = \min_{n \in N^C}(m_n^t + w^n); m_n^t = \frac{id_d^t}{band_n^d};$$

wherein, $N^C$ denotes a set of cloud resource nodes, $f^p$ denotes the remaining run-time of the application of numeral p, t denotes a numeral of a task, $p^t$ denotes the number of tasks comprised in the application of numeral p, $u^p$ denotes the elapsed run-time of the application of numeral p, $pr^p$ denotes the running progress of the application of numeral p, $m^t$ denotes the estimated minimum data transmission time of a task of numeral t, $w^n$ denotes the waiting time till the resource of a cloud resource node of numeral n becomes idle, $m_n^t$ denotes the data transmission time of the task of numeral t running on the cloud resource node of numeral n, $id_d^t$ denotes an amount of data stored by, the task of numeral t, on a cloud resource node of numeral d, and $band_n^d$ denotes a link bandwidth between the cloud resource node of numeral n and the cloud resource node of numeral d.

Optionally, the network training sub-module comprises:

a model mapping unit, configured for mapping the scheduling of the multiple tasks into a directed graph model;

a model transforming unit, configured for transforming the directed graph model into a residual graph;

a scheduling unit, configured for scheduling the multiple tasks to the multiple cloud resource nodes based on the preset scheduling method and the residual graph.

In the embodiments of the present application, a deep neural network to be trained is divided into multiple sub-network modules, and a pre-acquired set of training samples is divided into multiple subsets of samples. Distributed training of the deep neural network to be trained is performed with the multiple subsets of samples based on distributed cluster architecture and a preset scheduling method. The training of each subnetwork is accelerated by reducing the effect of network delay through data localization. Wherein, the multiple subnetworks are simultaneously trained, and training progresses of parallel subnetworks are synchronized so as to accelerate the distributed training of the deep neural network. The data localization means that a task is performed at a preset cloud resource node to minimize data transmission time. The use of the distributed cluster architecture and the preset scheduling method may optimize the simultaneous training of multiple subnetworks with multiple subsets of samples, adapt the training strategy in real time, synchronize the subnetworks trained in parallel, and accelerate the training of each subnetwork by reducing the effect of network delay through data localization. As such, the time required for the distributed training of the deep neural network may be reduced and the training efficiency of the deep neural network may be improved.

BRIEF DESCRIPTION OF THE DRAWINGS

To describe the solutions of embodiments of the invention or the prior art more clearly, the accompanying drawings to be used in the description of embodiments or the prior art will are described briefly below. Obviously, the accompanying drawings described below are merely drawings of some embodiments of the invention. Those skilled in the art may obtain other drawings based on these accompanying drawings without creative efforts.

DETAILED DESCRIPTION

Technical solutions in the embodiments of the present application are clearly and completely described below with reference to the accompanying drawings in association with embodiments of the present application. Obviously, the described embodiments are merely a part of but not all the embodiments of the present application. All other embodiments obtained without creative efforts in view of the embodiments of the present application by those skilled in the art fall within the scope of the present application.

In order to reduce the training time of a deep neural network and improve the training efficiency of the deep neural network, embodiments of the present invention provide a method, apparatus and computer readable storage medium for accelerating distributed training of a deep neural network.

The method for accelerating distributed training of a deep neural network provided by an embodiment of the present invention is firstly introduced below.

The method for accelerating distributed training of a deep neural network provided by an embodiment of the present invention may be applicable to any deep neural network available for distributed training. The present disclosure is not limited in this aspect. In order to implement the distributed training of the deep neural network based on a distributed cluster architecture, the method for accelerating the distributed training of a deep neural network as provided by the embodiment of the present invention may be applied to the management device in the distributed cluster, which is referred to as the management device hereinafter. This management device is configured to schedule and manage other distributed training node devices in the distributed cluster.

Figure 1:
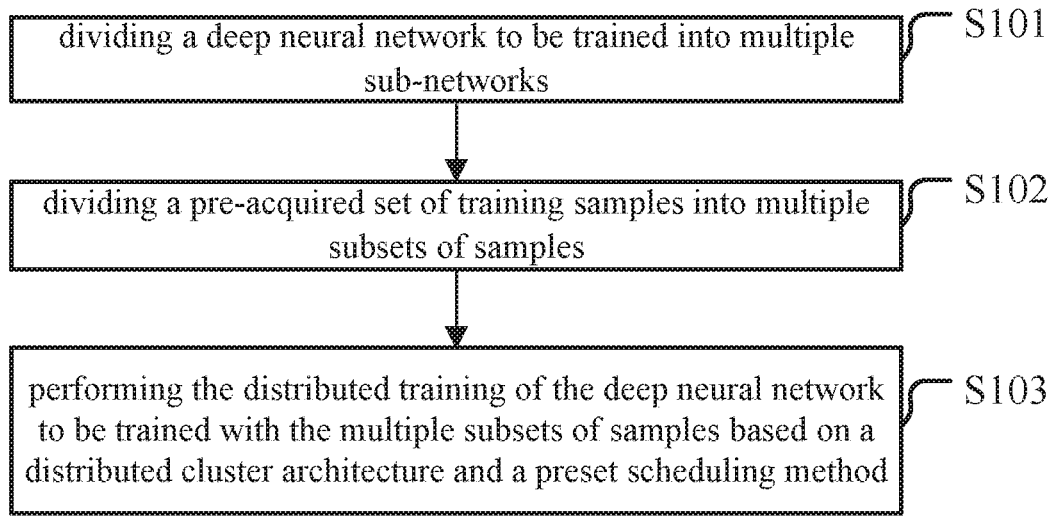
FIG. 1 is a flowchart of a method for accelerating distributed training of a deep neural network provided by an embodiment of the present invention.

As shown in FIG. 1, a method for accelerating the distributed training of a deep neural network comprises:

S101, dividing a deep neural network to be trained into multiple subnetworks;

S102, dividing a pre-acquired set of training samples into multiple subsets of samples;

S103, performing the distributed training of the deep neural network to be trained with the multiple subsets of samples based on a distributed cluster architecture and a preset scheduling method.

The training of each subnetwork is accelerated by reducing the effect of network delay through data localization. The multiple subnetworks are simultaneously trained, and training progresses of parallel subnetworks are synchronized to accelerate the training of the distributed deep neural network. The data localization means that a task is performed at a preset cloud resource node to minimize data transmission time.

In the embodiment of the present invention, the management device may first divide a deep neural network to be trained into multiple subnetworks by using a programming architecture, and divide a pre-acquired set of training samples into multiple subsets of samples. Then the management device may perform distributed training of the deep neural network to be trained with the multiple subsets of samples based on a distributed cluster architecture and a preset scheduling method. The training of each subnetwork is accelerated by reducing the effect of network delay through data localization. The multiple subnetworks are simultaneously trained, and training progresses of parallel subnetworks are synchronized to accelerate the training of the distributed deep neural network. The data localization means that a task is performed at a preset cloud resource node to minimize data transmission time. Through the use of the distributed cluster architecture and the preset scheduling method, the management device may optimize the training of multiple subnetworks, adapt training strategy in real time and synchronize the subnetworks trained in parallel. The training of each subnetwork is accelerated by reducing the effect of network delay through data localization. As such, the time required for the distributed training of the deep neural network may be reduced and the training efficiency of the deep neural network may be improved.

In step S101, in order to reduce the time required for training the deep neural network, the management device may first divide the deep neural network to be trained into multiple subnetworks by using a programming architecture. Wherein, the deep neural network to be trained may be any deep neural network to which distributed training is applicable. The specific type and purpose of the deep neural network may be determined as desired. The present disclosure is not limited in this aspect.

The deep neural network to be trained may be divided based on the structure thereof. The embodiment is not limited in this aspect. For example, a deep neural network to be trained comprising 5 convolutional layers and 2 fully connected layers may be divided into 7 subnetworks.

In step S102, the management device may divide a pre-acquired set of training samples into multiple subsets of samples by using a programming architecture. The training sample set refers to a set of training samples used to train the deep neural network to be trained. The pre-acquired set of training samples may be divided according to factors such as the number of training samples comprised in the set. The embodiment is not limited in this aspect.

It is noted that the order in which the above steps S101 and S102 are performed is not limited. Step S101 may be performed prior to or after step S102. Of course, steps S101 and S102 may be performed simultaneously. These will not affect the training of multiple subnets in subsequent steps.

Next, after multiple subnetworks and multiple subsets of samples are obtained by dividing, the above step S103 may be performed through the programming architecture, wherein, the multiple subsets of samples are used to train the deep neural network based on distributed cluster architecture and a preset scheduling method. The multiple subnetworks may be simultaneously trained, so as to implement the distributed training of the deep neural network. The distributed cluster architecture may be, for example, a MapReduce architecture.

Specifically, the management device may reduce, through data localization, the effect of network delay on the subnetworks in distributed training based on the distributed cluster architecture and the preset scheduling method, synchronize the training progresses of parallel subnetworks, and thus accelerate the training of the distributed deep neural network. The preset scheduling method may be interpreted as: reducing the effect of the network delay on the subnetworks in distributed training through data localization and synchronizing the training progresses of the parallel subnetworks.

The data localization means that a task is performed at a preset cloud resource node such that data transmission time may be minimized. In other words, a cloud resource node in the distributed cluster architecture may simultaneously serve as a data storage node and a task performing node. As a data storage node, it may be configured to store the data required to perform a task, i.e., to the extent of the present embodiment, a subset of samples or a training result obtained by training a subnetwork. As a task performing node, it may be configured to perform a task, i.e., to the extent of the present embodiment, training a subnetwork. As such, the data localization means that a task is performed at a data storage node storing the data for the task; or otherwise, performed at a task performing node as close as possible to the data storage node, so that the data for the task may not have to be transmitted through a network or may be able to be quickly transmitted through the network. The time required for data transmission may thus be minimized.

It is appreciated that, in the distributed cluster architecture, graphics processors are distributed on the cloud resource nodes, so that a cloud service architecture of graphics processor is formed. Therefore, the management device may perform distributed training on the multiple subnetwork modules by using cloud resource nodes based on the distributed cluster architecture.

For example, the set of training samples may be divided into 5 subsets of samples. At the beginning of the training, the 5 subsets of samples may be simultaneously input into input-layer subnetworks obtained by dividing the deep neural network to be trained, respectively. At this point, the distributed cluster architecture comprises 5 subnetworks being trained in parallel. In the subsequent training processes, other subnetworks may also be trained in parallel, depending on training results of their associated subnetworks. For clarity, the distributed training method for training deep neural network with multiple subsets of samples based on the distributed cluster architecture will be further introduced by way of example.

In one implementation of the embodiment of the present invention, the above distributed cluster architecture may comprise multiple cloud resource nodes having multiple applications executed thereon. Each of the applications may comprise multiple tasks configured for training the subnetworks based on an input data set. The data set may be a subset of samples or a training result obtained from a previous training stage of the subnetworks.

In one implementation, if the above distributed cluster architecture is a MapReduce architecture, the above multiple tasks may comprise a map task and multiple reduce tasks; wherein, the map task is used for training the subnetworks based on the subsets of samples, and the reduce task is used for aggregating the training results obtained from various stages of training by the map task.

In this case, the step of performing distributed training of the deep neural network to be trained with the multiple subsets of samples based on a distributed cluster architecture and a preset scheduling method may comprise:

scheduling the multiple tasks to the multiple cloud resource nodes according to equation $$c = \min\left(\sum_{p=1}^{A} a^p\right),$$

accelerating the training of each subnetwork, and synchronizing training progresses of the multiple subnetworks, so as to accelerate the distributed training of the entire deep neural network to be trained;

wherein, c denotes the remaining time required to fulfill the current training of the distributed deep neural network, p denotes a numeral of an application, A denotes the number of the applications, and $a^p$ is a sum of remaining run-time and data transmission time of the application of numeral p.

In the training process of the deep neural network, fast data transmission is crucial for the reduction of training time of the deep neural network, as any delayed data transmission will prolong the training of a subnetwork. Moreover, results of parallel trainings on different cloud resource nodes may be required to update neural network parameters. Therefore, in this case, the disparities between training progresses of the subnetworks trained in parallel may have an effect on the time required to update the parameters of the deep neural network.

Each of the training processes of the deep neural network may be considered as an application in a distributed cluster. As such, in order to complete the distributed training of the deep neural network, the above distributed cluster architecture may comprise three types of applications. The first type is a distribution application that divides each set of training samples into multiple subsets of samples having a small amount of data. The second type is a training application used for the training of one or more deep neural networks. The third type is an updating application that updates the current deep neural network based on all training results. As such, the applications in the training of the distributed deep neural network are concurrent and successive.

Each application may comprise multiple tasks that cooperate to process sub-sets of samples having a small data amount, i.e., to train the deep neural network based on the sub-sample set.

In an example, a distributed cluster may comprise multiple cloud resource nodes, with numerals 1, 2, . . . , C for each node. At the same time, applications with numerals 1, 2, . . . , A are ready to be scheduled to run in the cluster. The set of cloud resource nodes is denoted by $N^C$, and the set of applications is denoted by $p^A$. Application P comprises $p^t$ tasks.

It is appreciated that a sum of remaining run-time and data transmission time of all applications determines the training time of the deep neural network. Therefore, in order to minimize the training time of the deep neural network, it is necessary to find the minimum sum of the remaining run-time and data transmission time of all applications. Therefore, the management device may schedule multiple tasks to multiple cloud resource nodes according to equation $$c = \min\left(\sum_{p=1}^{A} a^p\right)$$

so as to perform distributed training of multiple subnetworks. As such, the training time of the deep neural network may be reduced as much as possible.

The data transmission time is crucial for the reduction of training time and the acceleration of the parallel training of the deep neural network based on the distributed cluster architecture. The data transmission time may be affected by two major factors: data amount and available network bandwidth.

The transmission time for the data of a task is determined by the ratio of the amount of data to the link bandwidth. Therefore, the transmission time for the data of a task t running on a cloud resource node n may be determined by the following equation (1):

$$m_n^t = \frac{id_d^t}{band_n^d} \tag{1}$$

Wherein, $id_d^t$ is the amount of data stored, by the task t, on a cloud resource node d, and $band_n^d$ is the link bandwidth between the cloud resource node n and the cloud resource node d.

Each task has its data stored on a fixed cloud resource node in the distributed cluster architecture. As such, the data transmission time depends on available bandwidth between the cloud resource node on which the data is stored and the cloud resource node on which the task is performed. Obviously, the minimization of the data transmission time is to select a cloud resource node with best available bandwidth to perform the task.

The minimum data transmission time of a task t is estimated as follows:

$$m^t = \min_{n \in N^C}(m_n^t + w^n) \tag{2}$$

Wherein, $m^t$ denotes the estimated minimum data transmission time of the task t, $w^n$ denotes the waiting time till the resource of the cloud resource node n becomes idle, and $m_n^t$ is the data transmission time for the task t running on the cloud resource node n.

If a cloud resource computing node is currently idle, a task may be immediately initiated thereon, and the waiting time is thus 0; if the cloud resource computing node is currently busy, i.e., performing a task, the waiting time is the remaining run-time for one of the tasks which is closest to its end.

Tasks may come from different applications that are successive in the training of the deep neural network. In order to avoid the situation where subsequent applications are delayed due to a previous application, the applications have to be initiated in synchronization with each other. When a task is optimized for data transmission, the remaining run-time may be calculated based on the running progress of an application as follows:

$$f^p = \begin{cases} u^p \times \dfrac{1 - pr^p}{pr^p}, & 0 < pr^p \leq 1 \\ u^p, & pr^p = 0 \end{cases} \tag{3}$$

Wherein, $f^p$ denotes the remaining run-time of an application p, $u^p$ denotes the elapsed run-time of the application p, and $pr^p$ denotes the running progress of the application p. In this implementation, the progress of an application would be 0 if it has not yet initiated a task. The progress of an application that has already initiated a task can be acquired.

Furthermore, in order to reduce training time of the distributed deep neural network as much as possible, the management device needs to minimize the sum of the remaining run-time and data transmission time of each application, which may be represented as:

$$a^p = f^p + \min_{n \in N^C} \sum_{t=1}^{p^t} m^t \quad (4)$$

In order to accelerate the distributed training of the neural network in the distributed cluster architecture, the sum of the remaining run-time and transmission time of all applications is to be minimized, as shown below:

$$c = \min\left(\sum_{p=1}^{A} a^p\right) \quad (5)$$

To minimize the sum of the remaining run-time and data transmission time of all applications, tasks have to be properly scheduled to the cloud resource nodes.

Figure 2:
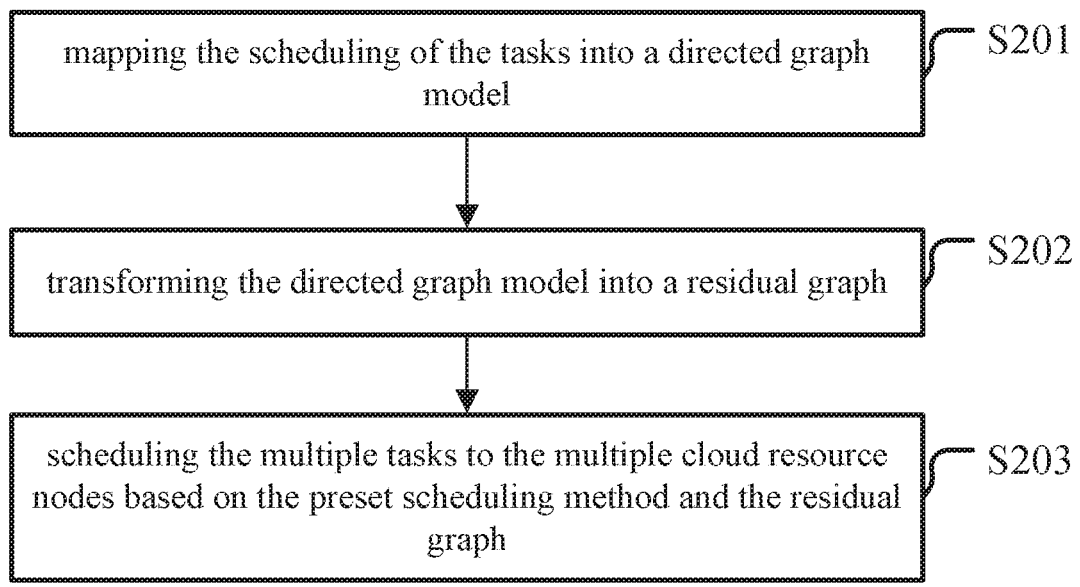
FIG. 2 is a flowchart of a manner of task scheduling provided by an embodiment of the present invention.

In one implementation, as shown in FIG. 2, the above step of scheduling the multiple tasks to the multiple cloud resource nodes according to the equation $$c = \min\left(\sum_{p=1}^{A} a^p\right)$$

may comprise:

S201, mapping the scheduling of the tasks into a directed graph model.

In order to properly schedule multiple tasks to fulfill the purpose as shown by equation (5), the management device may map the scheduling of the multiple tasks in the distributed cluster architecture into a directed graph model. The directed graph model is a model comprising nodes, and directed edges between the nodes.

S202, transforming the directed graph model into a residual graph;

S203, scheduling the multiple tasks to the multiple cloud resource nodes based on the preset scheduling method and the residual graph.

In order to minimize the training time, the management device may further transform the directed graph model into a residual graph. Then, based on the preset scheduling method and the residual graph, the multiple tasks are scheduled to the multiple cloud resource nodes, so as to minimize the training time of the distributed deep neural network model.

In one implementation of an embodiment of the present invention, the step of mapping the scheduling of the tasks into a directed graph model may comprise:

mapping the scheduling of the multiple tasks into the following directed graph model:

wherein, the directed graph model comprises a source node, application nodes, task nodes, computing nodes, and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node.

For ease of description, the source node, application nodes, task nodes, computing nodes, and destination node in the directed graph model may be collectively referred to as node objects. Wherein, an application node corresponds to an application in the distributed cluster architecture, a task node corresponds to a task in the distributed cluster architecture, and a computing node corresponds to a cloud resource node in the distributed cluster architecture. The source node and the destination node are used to limit the total number of scheduling of tasks.

Each of the node objects has a potential. A positive potential denotes that the node object has assignable tasks, the number of the assignable tasks being equal to the positive potential. A negative potential denotes that the number of tasks that have been assigned to the node object exceeds the maximum number of assignable tasks of the node object, and the number of excessive tasks is the absolute value of the negative potential.

In the directed graph model, if there is a directed edge between an application node and a task node, a task corresponding to the task node belongs to an application corresponding to the application node; if there is a directed edge between a task node and a computing node, the cloud resource node corresponding to the computing node may meet the requirements for running the task corresponding to the task node.

Each directed edge has two attribute values: cost and capacity. Wherein, the cost of a directed edge from a source node to an application node denotes a normalized remaining run-time (i.e., the remaining run-time of the application divided by the capacity). The cost of a directed edge from an application node to a task node is 0 (i.e., all tasks are not distinguishable). The cost of a directed edge from a task node to a computing node denotes the data transmission time required by a task corresponding to the task node, the task being performed on a cloud resource node corresponding to the computing node. The cost of a directed edge from a computing node to a destination node denotes the waiting time till the resource of a cloud resource node corresponding to the computing node becomes idle. The capacity of a directed edge denotes a total number of schedulable tasks of the originating node of this directed edge.

Thus, in this directed graph model, the sum of the costs of all the directed edges is the sum of remaining run-time and data transmission time of all the applications. Therefore, the above equation (5) may be transformed into a minimization of the sum of the costs of all the directed edges in the directed graph model.

Then, the management device may, by properly scheduling tasks, minimize the sum of the costs of all the directed edges in the directed graph model while completing the distributed training of the deep neural network.

Figure 3:
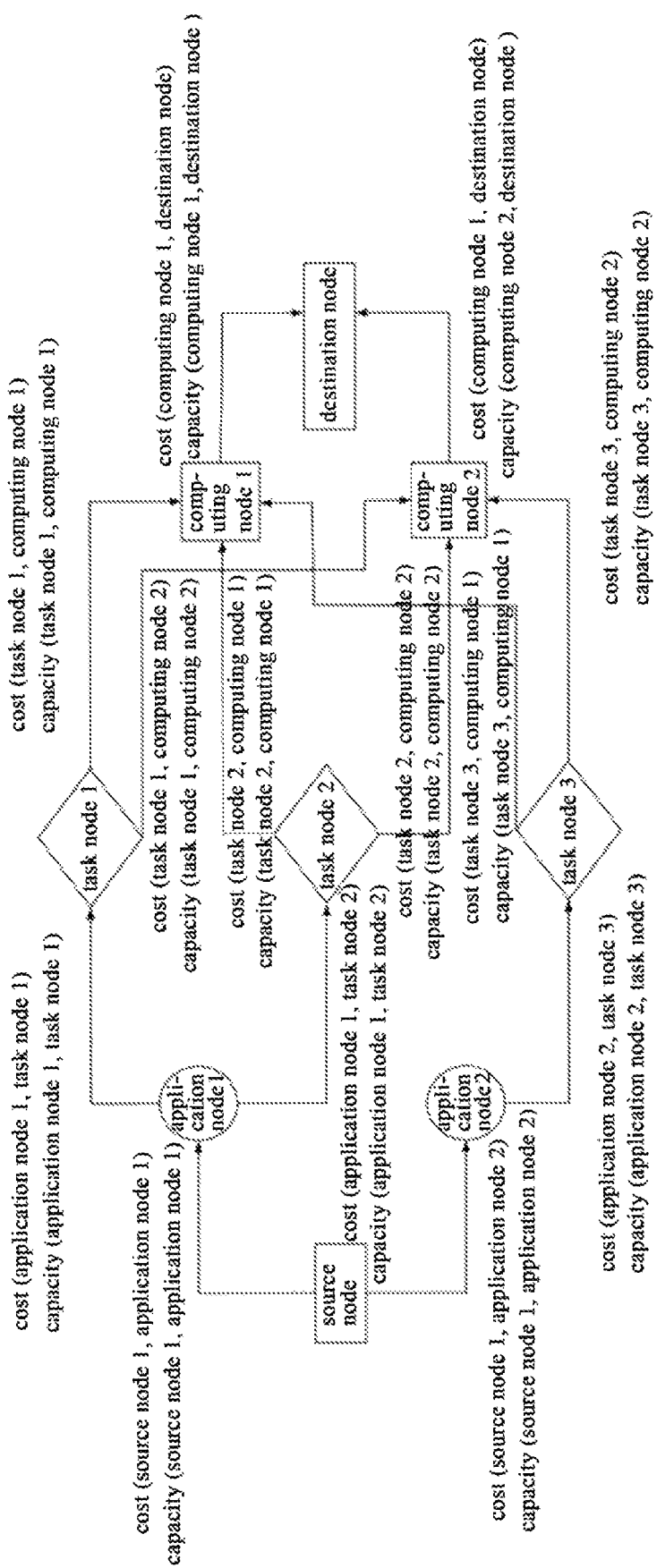
FIG. 3 is a schematic diagram of a directed graph model provided by an embodiment of the present invention.

FIG. 3 shows an example of a directed graph model. This directed graph model comprises two applications (i.e., application 1 and application 2), and two computing nodes (i.e., computing node 1 and computing node 2). The application 1 has two tasks to be scheduled, corresponding to, for example, task node 1 and task node 2 in FIG. 3. The application 2 has only one task to be scheduled, corresponding to, for example, task node 3. If the capacity of the directed edge from the source node to the application is 1, then the application 1 may only select 1 task to schedule. For the directed graph model shown in FIG. 3, the potential of the source node is 3 if the distributed cluster has sufficient computing power.

The capacity (A, B) in FIG. 3 denotes the capacity of the directed edge from A to B, and the cost (A, B) denotes the cost of the directed edge from A to B. Wherein, A and B denote the names of node objects.

Figure 4:
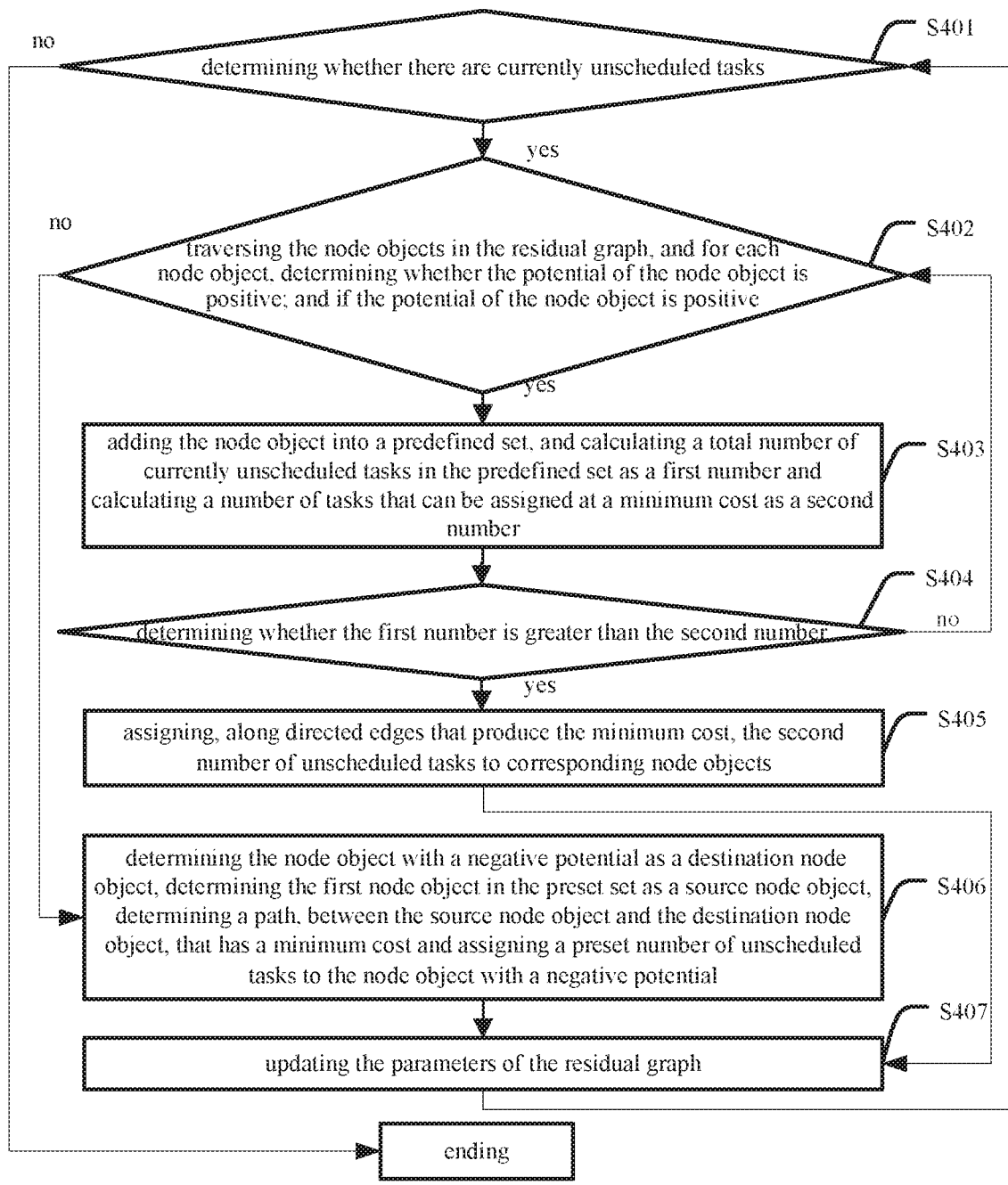
FIG. 4 is a specific flowchart of step S203 in the embodiment shown in FIG. 2.

In a case where the scheduling of the multiple tasks is mapped to the above directed graph model, in one implementation of the embodiments of the present invention, as shown in FIG. 4, the step of scheduling the multiple tasks to the multiple cloud resource nodes based on the preset scheduling method and the residual graph may comprise:

S401, determining whether there are currently unscheduled tasks; and if there are unscheduled tasks, proceeding to step S402, or if there are no unscheduled tasks currently, terminating the flow.

Firstly, the management device may determine whether there are currently unscheduled tasks. The existence of unscheduled tasks indicates that the training of the deep neural network has not ended. Then the management device may perform step S402, in order to complete the training of the deep neural network. The absence of unscheduled tasks indicates that the training of the deep neural network has ended. As such, the flow may be terminated.

The management device may determine whether there are currently unscheduled tasks by traversing the node objects in the residual graph. Of course, this may also be implemented in other manners, as long as unscheduled tasks can be identified. The present disclosure is not limited in this aspect.

S402, traversing the node objects in the residual graph, and for each node object, determining whether the potential of the node object is positive; and if the potential of the node object is positive, proceeding to step S403, or if the potential of the node object is negative, proceeding to step S406.

In response to the existence of unscheduled tasks currently, the management device may traverse the node objects in the residual graph. For each node object, the management device may determine whether the potential of the node object is positive. A positive potential indicates that the node object has assignable tasks. The method then proceeds to step S403.

A negative potential indicates that the number of tasks that have been assigned to the node object exceeds the maximum number of assignable tasks for the node object. The method then proceeds to step S406.

S403, adding the node object into a predefined set, and calculating a total number of currently unscheduled tasks in the predefined set as a first number and calculating a number of tasks that can be assigned at a minimum cost as a second number.

The management device may add the node object with a positive potential into a predefined set, and calculate a total number of currently unscheduled tasks and a number of tasks that can be assigned at a minimum cost. As the cost of each directed edge can be obtained, the total number of currently unscheduled tasks in the predefined set and the number of tasks that can be assigned at a minimum cost can be determined by the management device. For ease of description, the total number of currently unscheduled tasks may be referred to as a first number, and the number of tasks that can be assigned at a minimum cost may be referred to as a second number.

After the management device calculates the total number of currently unscheduled tasks in the predefined set and the number of tasks that can be assigned at a minimum cost, the method may proceed to step S404.

S404, determining whether the first number is greater than the second number; and if the first number is greater than the second number, proceeding to step S405, or if the first number is less than the second number, proceeding back to step S402.

The management device may determine whether the first number is greater than the second number. A greater first number indicates that the total number of currently unscheduled tasks in the predefined set is greater than the number of tasks that can be assigned at a minimum cost. As such, in order to assign the tasks at a minimum cost as much as possible, the management device may perform step S405.

A greater second number indicates that the total number of currently unscheduled tasks in the preset set is not larger than the number of tasks that can be assigned at a minimum cost. In order not to waste the resources of the node objects, the method may return to step S402 to continue to traverse the residual map to determine node objects with a positive potential.

S405, assigning, along directed edges that produce the minimum cost, the second number of unscheduled tasks to corresponding node objects, and preceding to step S407.

If the total number of currently unscheduled tasks is greater than the number of tasks that can be assigned at a minimum cost, then the management device may assign, along directed edges that produce the minimum cost, the second number of unscheduled tasks to corresponding node objects. Thus, the resource of these node objects may be fully utilized, the tasks may be performed at a minimum cost, and the time required for performing the tasks may be reduced, so that the training time of the deep neural network may be reduced.

S406, determining the node object with a negative potential as a destination node object, determining the first node object in the preset set as a source node object, determining a path, between the source node object and the destination node object, that has a minimum cost and assigning a preset number of unscheduled tasks to the node object with a negative potential; wherein the preset number is a minimum capacity in the capacities of the directed edges comprised in the path.

If the potential of this node object is negative, the management device may determine this node object as a destination node object, determine the first node object in the above preset set as the source node object, and thus determine a path, between the source node object and the destination node object, that has a minimum cost. A preset number of unscheduled tasks are assigned to the node object with negative potential.

The above preset number is a minimum capacity in the capacities of the directed edges comprised in the path. It may be understood that the number of unscheduled tasks assigned to a node object cannot exceed the capacity of each directed edge comprised in the path, otherwise the unscheduled tasks may not run normally.

For example, the management device determines that the path having a minimum cost between the source node object and the destination node object comprises 3 directed edges with capacities of 4, 5 and 6, respectively, then the management device may assign 4 unscheduled tasks to this node object with negative potential.

S407, updating the parameters of the residual graph and proceeding back to the step S401.

After the assignment of tasks and execution of step S405 or S406, currently unscheduled tasks and parameters (e.g., potentials of node objects or capacities of directed edges) may be subject to changes. In this case, the management advice may update the parameters of the residual graph according to actual task scheduling conditions. A residual graph with updated parameters is thus obtained. The method then proceeds back to the above step S401 and the subsequent steps are repeated. The training of the deep neural network is completed when no presence of unscheduled tasks is identified.

In the task scheduling manner described above, as tasks are scheduled along a minimum-cost path and the sum of the costs of the directed edges is minimized, the data transmission time is minimized. As such, the purpose of minimizing the training time of the depth neural network is achieved.

In correspondence with the method for training a distributed deep neural network as described above, embodiments of the present application also provides an apparatus for accelerating distributed training of a deep neural network.

The apparatus for accelerating distributed training of a deep neural network as provided by the embodiment of the present invention is introduced below.

Figure 5:
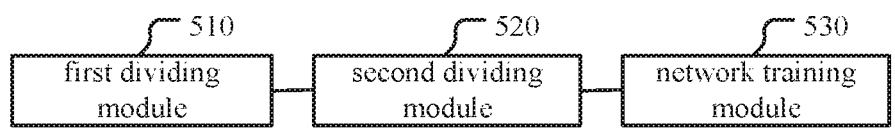
FIG. 5 is a schematic structural diagram of an apparatus for accelerating distributed training of a deep neural network provided by an embodiment of the present invention.

As shown in FIG. 5, the apparatus for accelerating distributed training of a deep neural network comprises:

a first dividing module 510, configured for dividing a deep neural network to be trained into multiple subnetworks;

a second dividing module 520, configured for dividing a pre-acquired set of training samples into multiple subsets of samples;

a network training module 530, configured for performing the distributed training of the deep neural network to be trained with the multiple subsets of samples based on a distributed cluster architecture and a preset scheduling method; wherein, the training of each subnetwork is accelerated by reducing the effect of network delay through data localization; wherein, the multiple subnetworks are simultaneously trained, and training progresses of parallel subnetworks are synchronized to accelerate the distributed training of the deep neural network; wherein, the data localization means that a task is performed at a preset cloud resource node to minimize data transmission time.

In the embodiments of the present application, the management device may divide a deep neural network to be trained into multiple subnetwork modules, and divide a pre-acquired set of training samples into multiple subsets of samples. Thus, distributed training of the deep neural network to be trained is performed with the multiple subsets of samples based on distributed cluster architecture and a preset scheduling method. The training of each subnetwork is accelerated by reducing the effect of network delay through data localization. Wherein, the multiple subnetworks are simultaneously trained, and training progresses of parallel subnetworks are synchronized so as to accelerate the distributed training of the deep neural network. The data localization means that a task is performed at a preset cloud resource node to minimize data transmission time. The management device may optimize the simultaneous training of multiple subnets with multiple subsets of samples, adapt the training strategy in real time, synchronize the subnetworks trained in parallel, and accelerate the training of each subnetwork by reducing the effect of network delay through data localization. As such, the time required for the distributed training of the deep neural network may be reduced and the training efficiency of the deep neural network may be improved.

In one implementation of the embodiment of the present invention, the above distributed cluster architecture comprises multiple cloud resource nodes having multiple applications executed thereon, each of the applications comprising multiple tasks; wherein, each of the tasks is configured for training a subnetwork based on an input data set, and the data set comprises a subset of samples or a training result obtained from a previous training stage of the subnetwork.

the network training module 530 may comprise:

a network training sub-module (not shown in FIG. 5), configured for scheduling the multiple tasks to the multiple cloud resource nodes according to equation $$c = \min\left(\sum_{p=1}^{A} a^p\right),$$

accelerating the training of each subnetwork, and synchronizing training progresses of the multiple subnetworks, so as to accelerate the distributed training of the entire deep neural network to be trained;

wherein, c denotes the remaining time required to fulfill the current distributed training of the deep neural network, p denotes a numeral of an application, A denotes the number of the applications, and $a^p$ denotes a sum of remaining run-time and data transmission time of the application of numeral p obtained by a time computing module.

In one implementation of the embodiment of the present invention, the above time computing module may comprise:

a time computing sub-module (not shown in FIG. 5), configured for calculating the sum of remaining run-time and data transmission time of the application of numeral p according to the following equations:

$$a^p = f^p + \min_{n \in N^C} \sum_{t=1}^{p^t} m^t; \quad f^p = \begin{cases} u^p \times \dfrac{1 - pr^p}{pr^p}, & 0 < pr^p \le 1 \\ u^p, & pr^p = 0 \end{cases};$$

$$m^t = \min_{n \in N^C}(m_n^t + w^n); \quad m_n^t = \dfrac{id_d^t}{band_n^d};$$

wherein, $N^C$ denotes a set of cloud resource nodes, $f^p$ denotes the remaining run-time of the application of numeral p, t denotes a numeral of a task, $p^t$ denotes the number of tasks comprised in the application of numeral p, $u^p$ denotes the elapsed run-time of the application of numeral p, $pr^p$ denotes the running progress of the application of numeral p, $m^t$ denotes the estimated minimum data transmission time of a task of numeral t, $w^n$ denotes the waiting time till the resource of a cloud resource node of numeral n becomes idle, $m_n^t$ denotes the data transmission time of the task of numeral t running on the cloud resource node of numeral n, $id_d^t$ denotes an amount of data stored by, the task of numeral t, on a cloud resource node of numeral d, and $band_n^d$ denotes a link bandwidth between the cloud resource node of numeral n and the cloud resource node of numeral d.

In one implementation manner of the embodiment of the present invention, the above network training sub-module may comprise:

a model mapping unit (not shown in FIG. 5), configured for mapping the scheduling of the multiple tasks into a directed graph model;

a model transforming unit (not shown in FIG. 5), configured for transforming the directed graph model into a residual graph;

a task scheduling unit (not shown in FIG. 5), configured for scheduling the multiple tasks to the multiple cloud resource nodes based on the preset scheduling method and the residual graph.

In one implementation of the embodiment of the present invention, the above model mapping unit may comprise:

a model mapping subunit (not shown in FIG. 5), configured for mapping the scheduling of the multiple tasks into a directed graph model as follows:

the directed graph model comprises a source node, application nodes, task nodes, computing nodes and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node;

wherein, each of the node objects has a potential, the node objects comprising the source node, the application nodes, the task nodes, the computing nodes and the destination node; wherein, a positive potential indicates that the node object has assignable tasks, the number of the assignable tasks being equal to the positive potential; a negative potential indicates that the number of tasks that have been assigned to the node object exceeds the maximum number of assignable tasks of the node object, and the number of excessive tasks is the absolute value of the negative potential; each directed edge has two attribute values: cost and capacity; the cost of a directed edge from a source node to an application node denotes a normalized remaining runtime; the cost of a directed edge from an application node to a task node is 0; the cost of a directed edge from a task node to a computing node denotes the data transmission time required by a task corresponding to the task node, the task being performed on a cloud resource node corresponding to the computing node; the cost of a directed edge from a computing node to a destination node denotes the waiting time till the resource of a cloud resource node corresponding to the computing node becomes idle; and the capacity of a directed edge denotes a total number of schedulable tasks of the originating node of this directed edge.

In one implementation of the embodiment of the present invention, the above task scheduling unit may comprise (not shown in FIG. 5): a first determining subunit, a traversing subunit, a computing subunit, a second determining subunit, a first scheduling subunit, a second scheduling subunit, and an updating subunit.

The first determining subunit is configured for determining whether there are currently unscheduled tasks; and if there are currently unscheduled tasks, activating the traversing subunit, or if there are no unscheduled tasks, terminating the flow;

The traversing subunit is configured for traversing the node objects in the residual graph, and for each node object, determining whether the potential of the node object is positive; if the potential of the node object is positive, activating the computing subunit; or if the potential of the node object is negative, activating the second scheduling subunit.

The computing subunit is configured for adding the node object into a predefined set, calculating a total number of currently unscheduled tasks in the predefined set as a first number, and calculating a number of tasks that can be assigned at a minimum cost as a second number.

The second determining subunit is configured for determining whether the first number is greater than the second number; and if the first number is greater than the second number, activating the first scheduling subunit, or if the first number is less than the second number, activating the traversing subunit.

The first scheduling subunit is configured for assigning, along directed edges that produce the minimum cost, the second number of unscheduled tasks to corresponding node objects, and triggering the updating subunit.

The second scheduling subunit is configured for determining the node object with a negative potential as a destination node object; determining the first node object in the predefined set as a source node object; determining a path, between the source node object and the destination node object, that has a minimum cost; and assigning a preset number of unscheduled tasks to the node object with a negative potential; wherein the preset number is a minimum capacity in the capacities of the directed edges comprised in the path.

The updating subunit is configured for updating the parameters of the residual graph and triggering the first determining subunit.

Embodiments of the present invention further provide a computer readable storage medium. The computer readable storage medium has a computer program stored thereon which, when being executed by a processor, performs the following steps:

dividing a deep neural network to be trained into multiple subnetworks;

dividing a pre-acquired set of training samples into multiple subsets of samples; and performing the distributed training of the deep neural network to be trained with the multiple subsets of samples based on a distributed cluster architecture and a preset scheduling method; wherein, the training of each subnetwork is accelerated by reducing the effect of network delay through data localization; wherein, the multiple subnetworks are simultaneously trained, and training progresses of parallel subnetworks are synchronized to accelerate the distributed training of the deep neural network; wherein, the data localization means that a task is performed at a preset cloud resource node to minimize data transmission time.

In the embodiments of the present application, as the computer program is being executed, a deep neural network to be trained is divided into multiple subnetwork modules, and a pre-acquired set of training samples is divided into multiple subsets of samples. Distributed training of the deep neural network to be trained is performed with the multiple subsets of samples based on distributed cluster architecture and a preset scheduling method. The training of each subnetwork is accelerated by reducing the effect of network delay through data localization. Wherein, the multiple subnetworks are simultaneously trained, and training progresses of parallel subnetworks are synchronized so as to accelerate the distributed training of the deep neural network. The data localization means that a task is performed at a preset cloud resource node to minimize data transmission time. The use of the distributed cluster architecture and the preset scheduling method may optimize the simultaneous training of multiple subnets with multiple subsets of samples, adapt the training strategy in real time, synchronize the subnetworks trained in parallel, and accelerate the training of each subnetwork by reducing the effect of network delay through data localization. As such, the time required for the distributed training of the deep neural network may be reduced and the training efficiency of the deep neural network may be improved.

The distributed cluster architecture above comprises multiple cloud resource nodes having multiple applications executed thereon, each of the applications comprising multiple tasks; wherein, each of the tasks is configured for training a subnetwork based on an input data set, and the data set comprises a subset of samples or a training result obtained from a previous training stage of the subnetwork.

The step of performing distributed training of the deep neural network to be trained with the multiple subsets of samples based on a distributed cluster architecture and a preset scheduling method comprises:

scheduling the multiple tasks to the multiple cloud resource nodes according to equation $$c = \min\left(\sum_{p=1}^{A} a^p\right),$$

accelerating the training of each subnetwork, and synchronizing training progresses of the multiple subnetworks, so as to accelerate the distributed training of the entire deep neural network to be trained;

wherein, c denotes the remaining time required to fulfill the current distributed training of the deep neural network, p denotes a numeral of an application, A denotes the number of the applications, and $a^p$ denotes a sum of remaining run-time and data transmission time of the application of numeral p.

The calculation of the sum of remaining run-time and data transmission time of the application of numeral p comprises:

calculating the sum of remaining run-time and data transmission time of the application of numeral p according to the following equations:

$$a^p = f^p + \min_{n \in N^C} \sum_{t=1}^{p^t} m^t; f^p = \begin{cases} u^p \times \frac{1-pr^p}{pr^p}, 0 < pr^p \le 1 \\ u^p, pr^p = 0 \end{cases};$$

$$m^t = \min_{n \in N^C}(m_n^t + w^n); m_n^t = \frac{id_d^t}{band_n^d};$$

wherein, $N^C$ denotes a set of cloud resource nodes, $f^p$ denotes the remaining run-time of the application of numeral p, t denotes a numeral of a task, $p^t$ denotes the number of tasks comprised in the application of numeral p, $u^p$ denotes the elapsed run-time of the application of numeral p, $pr^p$ denotes the running progress of the application of numeral p, $m^t$ denotes the estimated minimum data transmission time of a task of numeral t, $w^n$ denotes the waiting time till the resource of a cloud resource node of numeral n becomes idle, $m_n^t$ denotes the data transmission time of the task of numeral t running on the cloud resource node of numeral n, $id_d^t$ denotes an amount of data stored by, the task of numeral t, on a cloud resource node of numeral d, and $band_n^d$ denotes a link bandwidth between the cloud resource node of numeral n and the cloud resource node of numeral d.

The step of scheduling the multiple tasks to the multiple cloud resource nodes according to equation $$c = \min\left(\sum_{p=1}^{A} a^p\right)$$

comprises:

mapping the scheduling of the multiple tasks into a directed graph model;

transforming the directed graph model into a residual graph; and scheduling the multiple tasks to the multiple cloud resource nodes based on the preset scheduling method and the residual graph.

The step of mapping the scheduling of the multiple tasks into a directed graph model may comprise:

mapping the scheduling of the multiple tasks into a directed graph model comprises:

mapping the scheduling of the multiple tasks into a directed graph model as follows:

the directed graph model comprises a source node, application nodes, task nodes, computing nodes and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node;

wherein, each of the node objects has a potential, the node objects comprising the source node, the application nodes, the task nodes, the computing nodes and the destination node; wherein, a positive potential indicates that the node object has assignable tasks, the number of the assignable tasks being equal to the positive potential; a negative potential indicates that the number of tasks that have been assigned to the node object exceeds the maximum number of assignable tasks of the node object, and the number of excessive tasks is the absolute value of the negative potential; each directed edge has two attribute values: cost and capacity; the cost of a directed edge from a source node to an application node denotes a normalized remaining run-time; the cost of a directed edge from an application node to a task node is 0; the cost of a directed edge from a task node to a computing node denotes the data transmission time required by a task corresponding to the task node, the task being performed on a cloud resource node corresponding to the computing node; the cost of a directed edge from a computing node to a destination node denotes the waiting time till the resource of a cloud resource node corresponding to the computing node becomes idle; and the capacity of a directed edge denotes a total number of schedulable tasks of the originating node of this directed edge.

The step of scheduling the multiple tasks to the multiple cloud resource nodes based on the preset scheduling method and the residual graph comprises:

S401, determining whether there are currently unscheduled tasks; and if there are currently unscheduled tasks, proceeding to S402, or if there are no unscheduled tasks, terminating the flow;

S402, traversing the node objects in the residual graph, and for each node object, determining whether the potential of the node object is positive; if the potential of the node object is positive, proceeding to S403; or if the potential of the node object is negative, proceeding to S406;

S403, adding the node object into a predefined set, calculating a total number of currently unscheduled tasks in the predefined set as a first number, and calculating a number of tasks that can be assigned at a minimum cost as a second number;

S404, determining whether the first number is greater than the second number; and if the first number is greater than the second number, proceeding to S405, or if the first number is less than the second number, proceeding back to S402;

S405, assigning, along directed edges that produce the minimum cost, the second number of unscheduled tasks to corresponding node objects, and proceeding to S407;

S406, determining the node object with a negative potential as a destination node object; determining the first node object in the predefined set as a source node object; determining a path, between the source node object and the destination node object, that has a minimum cost; and assigning a preset number of unscheduled tasks to the node object with a negative potential; wherein the preset number is a minimum capacity in the capacities of the directed edges comprised in the path;

S407, updating the parameters of the residual graph and proceeding back to S401.

In view of the resemblance with previous embodiments, only a brief introduction of the embodiments of the apparatus and computer readable storage medium is provided. For relevant details, reference may be made to the description in the method embodiments.

It should be noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "comprise," "comprise" or any other variants are intended to cover a non-exclusive inclusion, such that processes, methods, objects or devices comprising a series of elements comprise not only those elements, but also other elements not specified or the elements inherent to those processes, methods, objects or devices. Without further limitations, elements limited by the phrase "comprise(s) a . . . " do not exclude that there are other identical elements in the processes, methods, objects or devices that comprise that element.

The various embodiments in the specification are described in an interrelated way, Reference may be made to the same or similar portions of the various embodiments, with the focus of description for each embodiment being placed on the difference(s) from other embodiments.

What has been described above are merely preferred embodiments of the application, and are not intended to limit the application. Any modification, equivalent replacement or improvement made within the spirit and principle of the application falls within the scope of protection of the application.

The invention claimed is:

1. A method for accelerating distributed training of a deep neural network, comprising:
dividing a deep neural network to be trained into multiple sub-networks;
dividing a pre-acquired set of training samples into multiple subsets of samples; and
performing the distributed training of the deep neural network to be trained with the multiple subsets of samples based on a distributed cluster architecture and a preset scheduling method; wherein, the training of each sub-network is accelerated by reducing an effect of network delay through data localization; wherein, the multiple sub-networks are simultaneously trained, and training progresses of parallel sub-networks are synchronized to accelerate the distributed training of the deep neural network; wherein, the data localization means that a task is performed at a preset cloud resource node to minimize data transmission time, wherein,
the distributed cluster architecture comprises multiple cloud resource nodes having multiple applications executed thereon, each of the applications comprising multiple tasks; wherein, each of the tasks is configured for training a sub-network based on an input data set, and the data set comprises a subset of samples or a training result obtained from a previous training stage of the sub-network;
wherein, performing distributed training of the deep neural network to be trained with the multiple subsets of samples based on a distributed cluster architecture and a preset scheduling method comprises:
scheduling the multiple tasks to the multiple cloud resource nodes according to equation $$c = \min\left(\sum_{p=1}^{A} a^p\right),$$

accelerating the training of each sub-network, and synchronizing training progresses of the multiple sub-networks, so as to accelerate the distributed training of the deep neural network to be trained;
wherein, c denotes a remaining time required to fulfill the current distributed training of the deep neural network, p denotes a numeral of an application, A denotes a number of the applications, and $a^p$ denotes a sum of remaining run-time and data transmission time of the application of numeral p.

2. The method of claim 1, wherein, a calculation of the sum of remaining run-time and data transmission time of the application of numeral p comprises:
calculating the sum of remaining run-time and data transmission time of the application of numeral p according to the following equations:

$$a^p = f^p + \min_{n \in N^C} \sum_{t=1}^{p^t} m^t; f^p = \begin{cases} u^p \times \dfrac{1 - pr^p}{pr^p}, & 0 < pr^p \le 1 \\ u^p, & pr^p = 0 \end{cases};$$

$$m^t = \min_{n \in N^C}(m_n^t + w^n); m_n^t = \dfrac{id_d^t}{band_n^d};$$

wherein, $N^C$ denotes a set of cloud resource nodes, $f^p$ denotes the remaining run-time of the application of numeral p, t denotes a numeral of a task, $p^t$ denotes a number of tasks comprised in the application of numeral p, $u^p$ denotes an elapsed run-time of the application of numeral p, $pr^p$ denotes a running progress of the application of numeral p, $m^t$ denotes an estimated minimum data transmission time of a task of numeral t, $w^n$ denotes a waiting time till the resource of a cloud resource node of numeral n becomes idle, $m_n^t$ denotes a data transmission time of the task of numeral t running on the cloud resource node of numeral n, $id_d^t$ denotes an amount of data stored by, the task of numeral t, on a cloud resource node of numeral d, and $band_n^d$ denotes a link bandwidth between the cloud resource node of numeral n and the cloud resource node of numeral d.

3. The method of claim 1, wherein, scheduling the multiple tasks to the multiple cloud resource nodes according to equation $$c = \min\left(\sum_{p=1}^{A} a^p\right)$$

comprises:
- mapping the scheduling of the multiple tasks into a directed graph model;
- transforming the directed graph model into a residual graph; and
- scheduling the multiple tasks to the multiple cloud resource nodes based on the preset scheduling method and the residual graph.

4. The method of claim 2, wherein, scheduling the multiple tasks to the multiple cloud resource nodes according to equation $$c = \min\left(\sum_{p=1}^{A} a^p\right)$$

comprises:
- mapping the scheduling of the multiple tasks into a directed graph model;
- transforming the directed graph model into a residual graph; and
- scheduling the multiple tasks to the multiple cloud resource nodes based on the preset scheduling method and the residual graph.

5. The method of claim 3, wherein, mapping the scheduling of the multiple tasks into a directed graph model comprises:
- mapping the scheduling of the multiple tasks into a directed graph model as follows:
- the directed graph model comprises a source node, application nodes, task nodes, computing nodes and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node;
- wherein, each of the node objects has a potential, the node objects comprising the source node, the application nodes, the task nodes, the computing nodes and the destination node; wherein, a positive potential indicates that the node object has assignable tasks, a number of the assignable tasks being equal to the positive potential; a negative potential indicates that a number of tasks that have been assigned to the node object exceeds a maximum number of assignable tasks of the node object, and a number of excessive tasks is an absolute value of the negative potential; each directed edge has two attribute values: cost and capacity; the cost of a directed edge from a source node to an application node denotes a normalized remaining runtime; the cost of a directed edge from an application node to a task node is 0; the cost of a directed edge from a task node to a computing node denotes the data transmission time required by a task corresponding to the task node, the task being performed on a cloud resource node corresponding to the computing node; the cost of a directed edge from a computing node to a destination node denotes a waiting time till the resource of a cloud resource node corresponding to the computing node becomes idle; and the capacity of a directed edge denotes a total number of schedulable tasks of the originating node of this directed edge.

6. The method of claim 4, wherein, mapping the scheduling of the multiple tasks into a directed graph model comprises:
- mapping the scheduling of the multiple tasks into a directed graph model as follows:
- the directed graph model comprises a source node, application nodes, task nodes, computing nodes and a destination node, and directed edges each of which originates from a source node and ends at an application node, directed edges each of which originates from an application node and ends at a task node, directed edges each of which originates from a task node and ends at a computing node, and directed edges each of which originates from a computing node and ends at a destination node;
- wherein, each of the node objects has a potential, the node objects comprising the source node, the application nodes, the task nodes, the computing nodes and the destination node; wherein, a positive potential indicates that the node object has assignable tasks, a number of the assignable tasks being equal to the positive potential; a negative potential indicates that a number of tasks that have been assigned to the node object exceeds a maximum number of assignable tasks of the node object, and a number of excessive tasks is an absolute value of the negative potential; each directed edge has two attribute values: cost and capacity; the cost of a directed edge from a source node to an application node denotes a normalized remaining runtime; the cost of a directed edge from an application node to a task node is 0; the cost of a directed edge from a task node to a computing node denotes the data transmission time required by a task corresponding to the task node, the task being performed on a cloud resource node corresponding to the computing node; the cost of a directed edge from a computing node to a destination node denotes a waiting time till the resource of a cloud resource node corresponding to the computing node becomes idle; and the capacity of a directed edge denotes a total number of schedulable tasks of the originating node of this directed edge.

7. The method of claim 5, wherein, scheduling the multiple tasks to the multiple cloud resource nodes based on the preset scheduling method and the residual graph comprises:
- S401, determining whether there are currently unscheduled tasks; and if there are currently unscheduled tasks, proceeding to S402, or if there are no unscheduled tasks, terminating a flow;
- S402, traversing the node objects in the residual graph, and for each node object, determining whether the potential of the node object is positive; if the potential of the node object is positive, proceeding to S403; or if the potential of the node object is negative, proceeding to S406;
- S403, adding the node object into a predefined set, calculating a total number of currently unscheduled tasks in the predefined set as a first number, and calculating a number of tasks that can be assigned at a minimum cost as a second number;

S404, determining whether the first number is greater than the second number; and if the first number is greater than the second number, proceeding to S405, or if the first number is less than the second number, proceeding back to S402;

S405, assigning, along directed edges that produce the minimum cost, the second number of unscheduled tasks to corresponding node objects, and proceeding to S407;

S406, determining the node object with a negative potential as a destination node object; determining the first node object in the predefined set as a source node object;

determining a path, between the source node object and the destination node object, that has a minimum cost; and assigning a preset number of unscheduled tasks to the node object with a negative potential; wherein the preset number is a minimum capacity in the capacities of the directed edges comprised in the path;

S407, updating the parameters of the residual graph and proceeding back to S401.

8. The method of claim 6, wherein, scheduling the multiple tasks to the multiple cloud resource nodes based on the preset scheduling method and the residual graph comprises:

S401, determining whether there are currently unscheduled tasks; and if there are currently unscheduled tasks, proceeding to S402, or if there are no unscheduled tasks, terminating a flow;

S402, traversing the node objects in the residual graph, and for each node object, determining whether the potential of the node object is positive; if the potential of the node object is positive, proceeding to S403; or if the potential of the node object is negative, proceeding to S406;

S403, adding the node object into a predefined set, calculating a total number of currently unscheduled tasks in the predefined set as a first number, and calculating a number of tasks that can be assigned at a minimum cost as a second number;

S404, determining whether the first number is greater than the second number; and if the first number is greater than the second number, proceeding to S405, or if the first number is less than the second number, proceeding back to S402;

S405, assigning, along directed edges that produce the minimum cost, the second number of unscheduled tasks to corresponding node objects, and proceeding to S407;

S406, determining the node object with a negative potential as a destination node object; determining the first node object in the predefined set as a source node object;

determining a path, between the source node object and the destination node object, that has a minimum cost; and assigning a preset number of unscheduled tasks to the node object with a negative potential; wherein the preset number is a minimum capacity in the capacities of the directed edges comprised in the path;

S407, updating parameters of the residual graph and proceeding back to S401.

9. An apparatus for accelerating distributed training of a deep neural network, comprising a memory and a processor, wherein, the memory is configured for storing a computer program; the processor is configured for executing the program stored in the memory to implement a method for accelerating distributed training of a deep neural network, comprising:

dividing a deep neural network to be trained into multiple sub-networks;

dividing a pre-acquired set of training samples into multiple subsets of samples; and performing the distributed training of the deep neural network to be trained with the multiple subsets of samples based on a distributed cluster architecture and a preset scheduling method; wherein, the training of each sub-network is accelerated by reducing an effect of network delay through data localization; wherein, the multiple sub-networks are simultaneously trained, and training progresses of parallel sub-networks are synchronized to accelerate the distributed training of the deep neural network; wherein, the data localization means that a task is performed at a preset cloud resource node to minimize data transmission time, wherein, the distributed cluster architecture comprises multiple cloud resource nodes having multiple applications executed thereon, each of the applications comprising multiple tasks; wherein, each of the tasks is configured for training a sub-network based on an input data set, and the data set comprises a subset of samples or a training result obtained from a previous training stage of the sub-network;

wherein, performing distributed training of the deep neural network to be trained with the multiple subsets of samples based on a distributed cluster architecture and a preset scheduling method comprises:

scheduling the multiple tasks to the multiple cloud resource nodes according to equation $$c = \min\left(\sum_{p=1}^{A} a^p\right),$$

accelerating the training of each sub-network, and synchronizing training progresses of the multiple sub-networks, so as to accelerate the distributed training of the deep neural network to be trained;

wherein, c denotes a remaining time required to fulfill the current distributed training of the deep neural network, p denotes a numeral of an application, A denotes a number of the applications, and $a^p$ denotes a sum of remaining run-time and data transmission time of the application of numeral p.

10. The apparatus of claim 9, wherein, a calculation of the sum of remaining run-time and data transmission time of the application of numeral p comprises:

calculating the sum of remaining run-time and data transmission time of the application of numeral p according to the following equations:

$$a^p = f^p + \min_{n \in N^C} \sum_{t=1}^{p^t} m^t; f^p = \begin{cases} u^p \times \dfrac{1-pr^p}{pr^p}, 0 < pr^p \le 1 \\ u^p, pr^p = 0 \end{cases};$$

$$m^t = \min_{n \in N^C}(m_n^t + w^n); m_n^t = \dfrac{id_d^t}{band_n^d};$$

wherein, $N^C$ denotes a set of cloud resource nodes, $f^p$ denotes the remaining run-time of the application of numeral p, t denotes a numeral of a task, $p^t$ denotes a number of tasks comprised in the application of numeral p, $u^p$ denotes an elapsed run-time of the application of numeral p, pr$^p$ denotes a running progress of the application of numeral p, m$^t$ denotes an estimated minimum data transmission time of a task of numeral t, w$^n$ denotes a waiting time till the resource of a cloud resource node of numeral n becomes idle, m$_n^t$ denotes a data transmission time of the task of numeral t running on the cloud resource node of numeral n, id$_d^t$ denotes an amount of data stored by, the task of numeral t, on a cloud resource node of numeral d, and band$_n^d$ denotes a link bandwidth between the cloud resource node of numeral n and the cloud resource node of numeral d.

11. The apparatus of claim 9, wherein, scheduling the multiple tasks to the multiple cloud resource nodes according to equation $$c = \min\left(\sum_{p=1}^{A} a^p\right)$$

comprises:
  mapping the scheduling of the multiple tasks into a directed graph model;
  transforming the directed graph model into a residual graph;
  scheduling the multiple tasks to the multiple cloud resource nodes based on the preset scheduling method and the residual graph.

12. The apparatus of claim 10, wherein, scheduling the multiple tasks to the multiple cloud resource nodes according to equation $$c = \min\left(\sum_{p=1}^{A} a^p\right)$$

comprises:
  mapping the scheduling of the multiple tasks into a directed graph model;
  transforming the directed graph model into a residual graph;
  scheduling the multiple tasks to the multiple cloud resource nodes based on the preset scheduling method and the residual graph.

* * * * *